UNITED STATES PATENT OFFICE.

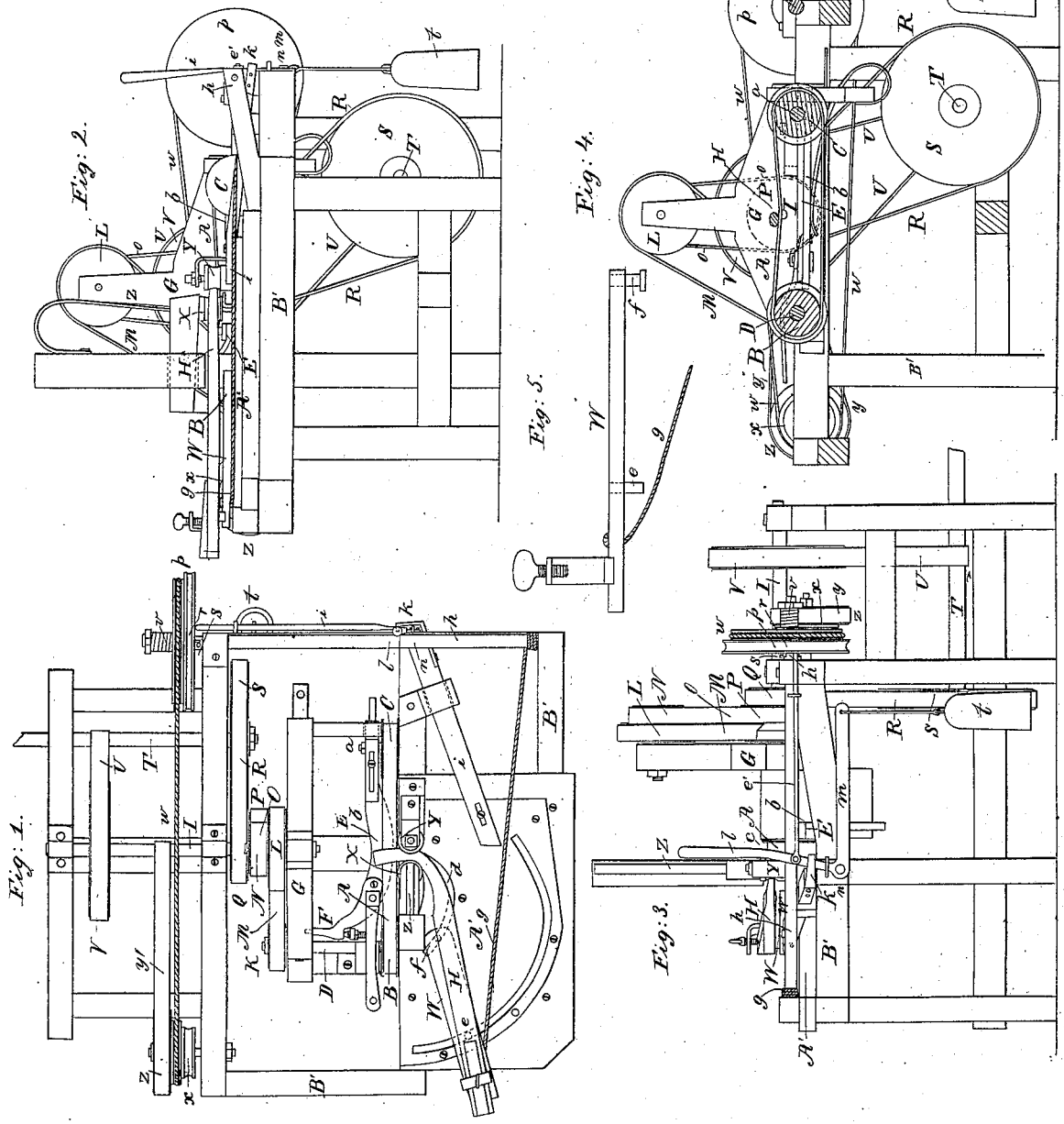

THOMAS BLANCHARD, OF BOSTON, MASSACHUSETTS.

MACHINE FOR POLISHING PLOW-HANDLES AND OTHER ARTICLES.

Specification of Letters Patent No. 10,497, dated February 7, 1854.

*To all whom it may concern:*

Be it known that I, THOMAS BLANCHARD, of Boston, in the county of Suffolk and State of Massachusetts, have invented a new and useful Machine for Polishing or Smoothing Plow-Handles and Various other Articles; and I do hereby declare that the same is fully described and represented in the following specification and the accompanying drawings, letters, figures, and references thereof.

Of the said drawings, Figure 1, denotes a top view of the said machine. Fig. 2, is a front elevation of it. Fig. 3, is a side elevation of it. Fig. 4, is a vertical section of it taken longitudinally through its endless polishing belt.

The main principle or part of my invention consists in a peculiar method of applying to and operating on or against a plow handle or other article of similar character an endless smoothing or polishing belt whereby while said article is held in a suitable position or moved or slowly fed along such belt shall be made not only to run around its sustaining roller or rollers or the equivalents therefor, but to rest in contact with and make one entire revolution or passage around the surface to be reduced, smoothed, or polished, and as auxiliary to such my invention further consists in a combination therewith of a suitable device or contrivances for sustaining the article to be operated upon and properly presenting it to and feeding it along under the action of the said endless belt, while it is in such peculiar or compound movement.

In the drawings, which make part of my specification, A, represents the endless belt whose external surface is to be covered with emery or some other suitable grinding, smoothing, or polishing material, or is to be properly prepared in any manner for the purpose of smoothing, polishing or graining an article, when such article is placed against it while it is in motion. This endless belt is supported on and by two rollers or pulleys B, C, one of which is fixed on the end of the shaft, D, while the other is made to run on a short shaft or journal, *a*, projecting from a lever, E, whose fulcrum is at F, and is supported by the frame, G, which carries the shaft, D. By means of power suitably applied to the arm, *b*, of the lever, the endless belt is borne or pressed against the plow handle or article, H, that is to be operated on and with such a degree of pressure as may produce the effect desirable.

The frame, G, which carries the shaft, D, is supported on the end of a mandrel or shaft, I, which is placed so that its axis ranges toward the part of the article, H, around which the endless belt, A, is to work. For the purpose of imparting longitudinal motion to the endless belt the shaft D, is provided with a pulley, K, around which and another pulley, L, an endless belt M, traverses, this last pulley deriving its motion from a pulley, N, attached to the side of it, and driven by an endless belt, O, that works around another pulley, P, which is placed and freely revolves on the shaft, I, and has another pulley, Q, attached to its side.

An endless belt, R, from a pulley, S, fixed on the driving shaft, T, communicates rotary motion to the pulley, Q, when the driving shaft is put in revolution. To another endless belt, U, extending around the driving shaft and a large pulley, V, fixed on the shaft, I, communicates motion to the shaft, I, and thereby creates such a rotation of the frame, G, as will cause the endless smoothing belt, A, while it is running on its rollers to revolve in a circle entirely around and in contact with the stick or article, H, and so as to progressively operate on the same while the belt extends across such circle of revolution. The said article, H, whether it be a plow handle or anything else capable of being so dressed, smoothed, polished or grained is supported on or affixed to a carriage, W, and is made to extend therefrom between two guide rollers, X, Y, one of which (viz., X,) is forced against it and presses it up to the other by means of a spring, Z, or its equivalent. The carriage, W, rests on a table frame or bed, A', whose upper surface is provided with suitable guide grooves, *c*, *d*, that respectively receive studs or projections, *e*, *f*, from the carriage (see Fig. 5, which denotes a side view of the carriage as it appears when detached from the machine) such grooves serving to properly guide and feed forward the carriage and the article, H, during the operation of smoothing or polishing the latter, the carriage, W, in the mean time being moved around or on the table by the draft of a cord or band, *g*, that is attached to it by one end and to a shaft, *h*, by its other end. The rotations of such shaft, $h$, wind the cord on the shaft, and draw around or over the table the carriage, W, until the said carriage is brought into contact with and made to move longitudinally on a retention slide $i$. This retention slide is arranged as seen in the drawings, and provided with a hook $k$, that operates in connection with a shifting lever composed of two arms $l$, $m$, (extended at right angles or thereabout to each other) and made to turn on a fulcrum at $n$, as seen in Fig. 3.

A slide rod, $e'$, is jointed at one end to the shifting lever and abuts at its other end against the side or hub of a double grooved or cone pulley $p$. Said pulley rotates freely on the shaft, $h$, and is provided with one or more clutch pins or projections, $r$, by which is connection with one or more others, $s$, projected from the shaft $h$, it may be clutched to such shaft.

A heavy weight is suspended from the inferior arm $m$ of the shifting lever and for the purpose of unclutching the cone pulley with the shaft $h$, whenever the hook $k$ is pushed away from contact with the upper arm of the shifting lever. A spring, $v$, serves under other circumstances to so move the cone pulley on its shaft as to clutch it thereto. An endless band, $w$, works around the cone pulley, $p$, and another cone pulley, $x$, which derives its rotary motion from an endless band, $y$, that runs around the mandrel, I, and a pulley, $z$, fixed to the side of the cone pulley, the whole being as seen in the drawings.

By applying the hand to the shifting lever and moving it so as to elevate its lower arm, I enable the cone pulley, $p$, to be moved into such engagement with the shaft on which it runs, as to cause it when in revolution to revolve such shaft. Under these circumstances if we move back the retention slide, the hook thereof may be made to hold the lever in place until the slide is moved in the opposite direction and by the carriage, W, as hereinbefore stated. As soon as such occurs, the further feed movement of the carriage will be arrested. The attendant next moves the carriage entirely back, removes the piece of work from it and supplies it with a fresh piece.

The operative parts of the machinery are to be supported by a suitable frame B', and when the machine is constructed as specified, it becomes automatic, and of great advantage in the polishing, smoothing or graining various kinds of irregular forms, such as plow handles, gun stocks, shovel handles, et cetera.

Instead of employing the feeding carriage the article to be polished or operated on may be held in the hands of an attendant and presented between the guide rollers or in any other proper way to the peculiar action of the reducing or polishing belt.

I do not claim the invention of an endless polishing or smoothing belt, but

What I do claim as new and of my invention is—

1. The above described mode of applying and operating said belt with respect to the article to be smoothed or polished; the same consisting in not only making the said belt to traverse or run on sustaining pulleys or their equivalents, but at the same time to rotate such belt and sustaining contrivances in such manner around the article to be smoothed or polished as to cause the belt while in motion on its rollers to run in contact with and around the surface of the article to be reduced, smoothed, or polished.

2. I also claim the combination of the feeding carriage, its guides, and the guide rollers, or the mechanical equivalents therefor with the endless polishing belt provided with machinery for imparting to it its compound motion or movement in two directions as specified.

In testimony whereof I have hereto set my signature this seventh day of July, A. D. 1853.

THOS. BLANCHARD.

Witnesses:
R. H. EDDY,
F. P. HALE, Jr.